May 28, 1968   A. F. ENEMARK ET AL   3,385,542
MOTOR COMPRESSOR UNIT WITH SPRING SUSPENSION
Filed Oct. 14, 1966

United States Patent Office 3,385,542
Patented May 28, 1968

3,385,542
MOTOR COMPRESSOR UNIT WITH
SPRING SUSPENSION
Arne F. Enemark, Orstedsgade 111, Sonderborg, Denmark; Knud V. Valbjorn, Augustenhof, Nordborg, Denmark; and Bendt W. Larsen, Vestergade 5, Augustenborg, Denmark
Filed Oct. 14, 1966, Ser. No. 586,765
Claims priority, application Germany, Oct. 16, 1965,
D 48,447
10 Claims. (Cl. 248—20)

ABSTRACT OF THE DISCLOSURE

A suspension system for machines, for example motor-compressors and particularly encapsulated refrigerant motor-compressors, having mounts spaced on a machine keeping it in suspension. Each mount has a conical buffer spring in cupped member the rim of which provides a fixed boundary wall circumferentially of a part of the spring therein defining a stop surface for deflection of the spring in a lateral direction or radial direction relative to the axis of the spring. The base of the cup acts as a stop for a pin coaxial in each spring thus limiting movement in an axial direction of the springs. As the coils apply themselves progressively to the two stop surfaces the resiliency of the individual springs increases progressively until the pin within each spring stops radial or axial movement thereof within a given mount.

---

This invention relates generally to suspension systems and more particularly to a motor-compressor unit with a spring suspension, and particularly, though not exclusively, to a small hermetically sealed refrigeration unit resiliently suspended in a hermetic capsule.

Resilient suspension is applied to reciprocably operating apparatus mainly for damping noise created by the unit or apparatus, for example a motor-compressor unit, during operation. However, known springs have various disadvantages. In order to achieve satisfactory silencing, they have to be comparatively soft with the result that they are greatly deflected or compressed on impact loading such as is continuously experienced at the moment of starting of a motor-compressor and also during transportation of the unit. After starting a motor-compressor unit will only return to a steady position or state after performing a number of oscillations due to the disadvantages of known springs. Since the spring stroke or movement amplitude is large, the unit may easily bang against adjacent components. This may cause undesirable damage. To prevent this larger clearances, between the unit and a capsule, have to be provided for and this may, for example, result in a minimum capsule size for small refrigeration units being unattainable. Another factor is that known springs may sometimes be excited at a resonant frequency, for example during transportation on a vehicle where, for example, the joints between concrete sections in a highway produce a vibration frequency in the order of 6 to 7 c./s. If all these disadvantages are obviated by the use of a suitably strong spring, undesirable transmission of noise will result during operation of the motor-compressor.

The present invention therefore has as an object to provide a machine or apparatus, for example, a motor-compressor unit, with a spring suspension which, on the one hand, has satisfactory silencing properties and which, on the other hand, executes essentially reduced deflection upon impact, which settles to a rest condition or damps vibration within a relatively short period of time and does not readily respond or resonate to a resonant vibration. This is achieved by providing in the suspension system, according to the invention, springs which have a progressive characteristic of resilience in at least one loading direction.

The term "progressive characteristic of resilience" as employed hereinafter refers to a relationship between load and spring deflection in which a certain load variation or change produces a larger deflection variation or change in the spring under a small load than it would under a larger load. Thus the spring is "soft" under a small load and it will then exhibit satisfactory silencing properties. With a heavier load, on the other hand, it is "hard" and brakes the movement of the motor-compressor unit strongly. No resonant frequency vibrations can be set up, since the resonant frequency of the spring varies as the spring deflects or compresses and extends.

Since impacting loads may act upon the motor-compressor unit in various directions, for example during transportation, the spring suspension should have a progressive characteristic of resilience in various directions, or modes of operation. Springs with a progressive characteristic of resilience not only in one, but in several directions are therefore particularly suitable. Volute buffer springs are suitable for this application if they are wound in such a way that they have a progressive characteristic of resilience under radial as well as axial stresses.

The invention relates to a suspension system for resiliently supporting, in a capsule or housing, a machine and comprises a plurality of resilient mounts. The mounts are spaced in use on the machine.

By way of a preferred example of a system, movements and the type of spring according to the invention there can be provided a loosely coiled conical buffer spring with which a fixed, peripheral boundary wall of a stop member firmly surrounding the outermost coil and an axial stop member cooperative with a stop surface for the coils, on the side opposite the apex of the conical spring, are associated. Upon radial loading of the spring the coils apply themselves one after the other to the fixed, external boundary wall, thus successively becoming ineffective. Upon axial loading the coils or convolutions apply themselves one after the other to the stop surface and thus become ineffective and finally the axial stop member may engage the stop surface, whereby the effective spring constant increases and the axial stop member functions during excessive loading only.

It is known to use a conically coiled buffer spring for the support of a motor-compressor unit in a container or capsule making use of the fact that such a spring is capable of resiliently yielding in an axial direction as well as in a radial direction. However, this kind of spring has a linear characteristic or spring constant both in the axial as well as the radial direction of loading. Stop surfaces rendering the spring ineffective over part of its length are not provided in the known suspension systems.

According to the invention the center line of the buffer spring in the mounts of the suspension system, should occupy an eccentric position in the unloaded condition if the mass of the motor-compressor unit stresses the spring also in a radial direction. This eccentricity may be chosen such that the center line is returned to its central or true axial position when the spring is fully loaded or compressed.

In cases where the progression of the characteristic of resilience is the result of individual spring coils or convolutions meeting with a stop the spring assembly or mount may at the same time serve as a safety stop during transportation of the unit which becomes effective as soon as the spring has been compressed to within the axial length of the axial stop. In case of radial loading of a buffer spring, for example, this effect can be achieved if a fastening pin engaging the innermost coil of the buffer spring is situated axially within the fixed boundary wall for the outermost or endmost coil.

A safety stop for excessive loading, for example during transportation of the unit, in an axial direction may also be provided by a fastening pin of a selected length or provided with a flange such that, by engaging the boundary wall of the other stop member or the stop surface thereof it determines a final stop position of the spring assembly.

The way in which the springs of the system are arranged on the motor-compressor unit is not restricted to any particular way. Thus, a number of several springs may be employed whose axes extend parallel with the axis of the motor shaft of the unit. But the spring axes may also be inclined relative to the axis of the motor shaft, for example by being situated on the envelope of an imaginary cone. Additional advantages can be achieved if the spring axes extend radially of the axis of the apparatus or unit.

According to the invention a spring assembly comprising at least three springs may be employed, for example, which are situated at respective corners of a polygon and whose imaginary axes intersect within the polygon. The result is a centered motor-compressor unit such that the given radial play of the motor-compressor unit in any direction is restricted by a progressively increasing counterforce, i.e. only a small degree of deflection must be anticipated and it would be possible, for example, to let the container or capsule wall be disposed closely to the motor-compressor unit when it is in its position or condition of rest.

In a preferred embodiment of the invention four springs are located at the corners, of a motor-compressor unit, and their axes extend approximately along the diagonals of a rectangle which generally follows the shape of the pack of the motor stator laminations and whose longer sides are parallel with the cylinder axis of the compressor while its shorter sides extend generally perpendicular thereto. In a construction of this type the springs and mounts of the suspension system do not contribute to any increase of the capsule dimensions required. In particular, the minimum dimension of the capsule in a direction perpendicular to the cylinder axis and the motor shaft axis is only determined by the dimension of the lamination pack of the stator, which may be economy-punched if necessary, and by the clearance required in a suspension system with progressive resilience characteristic.

If it is desired to gain additional silencing capability at higher frequencies of vibration of the motor-compressor it is possible to connect at least one spring end to its associated mounting element by means of a piece of resilient material, for example a rubber washer.

The invention will now be described in further detail, by way of example, with reference to the accompanying drawings in which.

Figure 1:
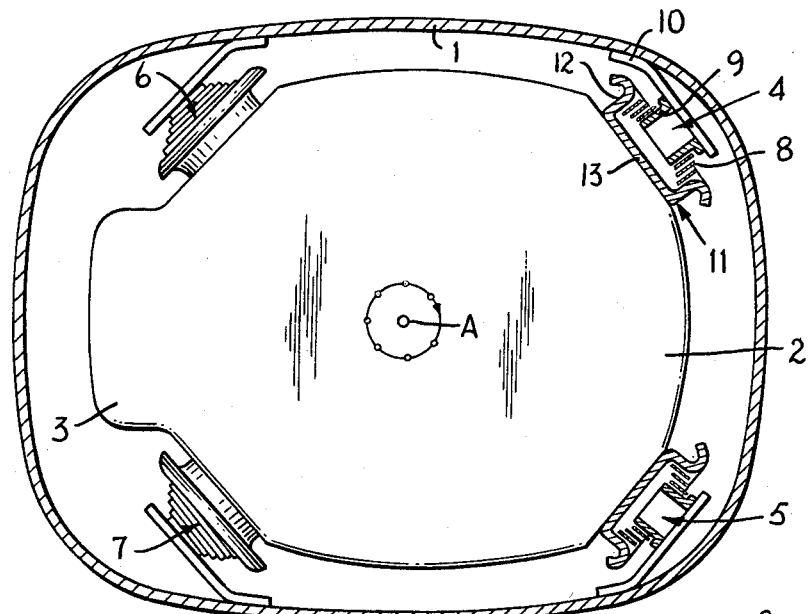
FIG. 1 is a cross section view of a diagrammatic representation of a small hermetically sealed refrigeration unit with a vertical motor shaft and provided with a suspension system according to the invention.

Referring now to the drawings in which a capsule 1 contains a motor-compressor unit 2 housed therein hermetically sealed, for example, and having a motor shaft axis A which extends vertically. The diagrammatic outline of the unit illustrates a laterally projecting cylinder 3 of the compressor. The motor-compressor unit 2 is suspended in the capsule 1 by a suspension system comprising four spring assemblies or mounts 4–7 all having the same construction. Each mount comprises a buffer spring 8, i.e. a conically wound coil spring. Each spring has the coils or helical convolutions reducing in diameter from one coil to the other in a direction from one end toward the other or opposite end. A hollow pin 9, mounted on a fixed support 10 connected to the container or capsule 1, engages the innermost coil of the spring and extends axially into the spring. Its largest endmost or outermost coil rests on a stop member formed as a cup 11 fixed on the motor-compressor unit 2, the rim 12 of which constitutes a fixed boundary wall firmly surrounding the outermost coil and whose bottom part 13 defines a stop surface for the coils of the buffer spring 8. A free end of the hollow stop pin 9 provides a final stop when the spring 8 is completely compressed.

Figure 2:
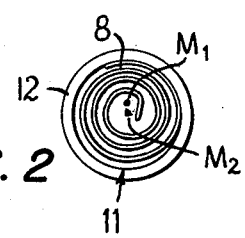
FIG. 2 is a plan view, from above, of a buffer spring employed in the suspension system shown in FIG. 1, with an external mounting element, and illustrates the spring in an unloaded condition.

As is apparent from FIG. 2, the shape of the buffer spring 8 in an unloaded condition is such that the center point $M_1$ of the inner coil is positioned eccentrically of the center point $M_2$ of the outer coil. During installation care is taken to ensure that the eccentric center point $M_1$ be on top, so that, upon loading by the motor-compressor unit 2, the points $M_1$ and $M_2$ will coincide.

The four spring assemblies 4–7 are located at the four corners of a rectangle which approximately follows the shape of the lamination pack of the stator of the motor, not shown, the longer sides of the rectangle run parallel with the cylinder axis while its shorter sides extend perpendicular thereto. The imaginary extensions of the axes of the buffer spring 8 extend approximately along the diagonals of the rectangle and intersect at the axis A of the motor shaft. It is clear that the spring assemblies or mounts do not require additional space within the container or capsule and, above all, do not necessitate a dimensional increase in the direction of a minimum dimension, i.e. perpendicular to the cylinder axis and the axis of the motor shaft. Moreover, the motor-compressor unit is satisfactorily centered within the hermetic capsule.

A main advantage of the buffer spring assemblies described here is that the springs are constructed so that in operation the springs in effect possess a progressive characteristic of resilience in an axial direction as well as in a radial direction. When the load increases in an axial direction, one coil after the other applies itself to the stop plate 13, beginning with the outer coil, so that the spring becomes increasingly stiff. When the load increases in a radial direction, one coil after the other applies itself to the part of the circumferential wall 12 which opposes it in the direction of loading, again beginning with the outer coil, so that the spring constant also increases in this case. The weight of the motor-compressor unit is accounted for by the eccentric position of the center point $M_1$ which the latter occupies in the unloaded condition.

Each spring assembly or mount serves also as a safety stop during transportation of the motor-compressor unit. Upon excesive loading in an axial direction all coils, and eventually the hollow pin 9, engage the stop surface 13, thus preventing further movement, axially of the springs, of the motor-compressor unit. Upon radial loading all the coils are urged toward the outer rim 12 by the hollow pin 9. To enable the hollow pin 9 to perform this function it extends axially within the space confined by the rim 12 and, in this way, further movement of the motor-compressor unit is also prevented in any radial direction.

Figure 3:
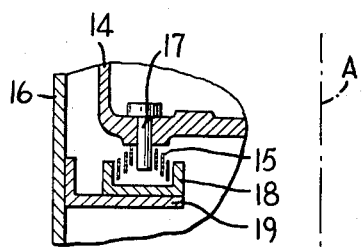
FIG. 3 is a fragmentary longitudinal section of a detail of a motor-compressor unit with a vertically disposed shaft, and illustrates another embodiment of a spring suspension according to the invention.

In FIGURE 3, a bearing element or portion 14 of a motor-compressor unit with a vertical shaft axis A is supported on a container or capsule 16 by an interposed buffer spring 15 whose axis extends parallel with the motor shaft axis. A stop member 17, connected to the bearing element 14, engages the inner or smaller coil of the conical, helical buffer spring 15. Its outer or largest coil, at the opposite end, is enclosed by a cup bracket member 18 which is mounted on the capsule by means of a cantilever bracket member 19.

Figure 4:
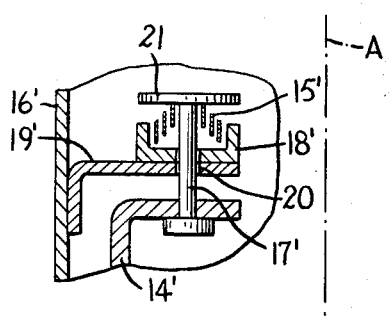
FIG. 4 is a fragmentary longitudinal section view of a detail of a motor-compressor unit with a vertical shaft, illustrating still another embodiment of a spring suspension.

While the motor-compressor unit in FIGURE 3 has a suspension system or mount assembly in which the unit is supported from below, it is resiliently suspended from above in the system in FIGURE 4 in which the corresponding elements have the same reference numerals as in FIGURE 3 except primed. All that is required here is to provide the cup-shaped stop 18′ and the cantilever bracket member 19′ with a hole 20, and the stop pin 17′ with a flange 21 at its outer end to change the concepts or teachings of the embodiment in FIG. 3 to an arrangement in which the unit is suspended rather than supported from underneath. The flange 21 contacts the end face of the cup 18′ in case of impact loading, and acts as a final stop and may serve as a safety stop during transportation of the apparatus in the manner in which the stop member A cooperates with the surface 13.

Figure 5:
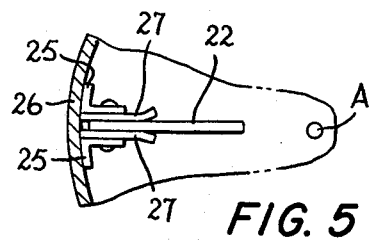
FIG. 5 is a fragmentary section view of a modification of the spring, in a suspension system according to the invention.
Figure 6:
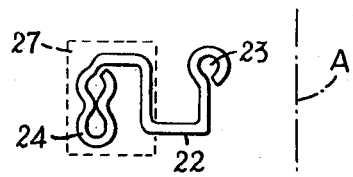
FIG. 6 is a side elevation view of the spring of FIG. 5.

In some cases it will be sufficient for a spring mount to comprises a spring which possesses a progressive characteristic of resilience merely in one direction of loading. Such a spring is illustrated in FIGS. 5 and 6. It consists of a bent or shaped coiled spring wire 22 which has a free end 23 to support a motor-compressor unit with a vertical shaft in cooperation with two or three other spring mounts of the same type. At its mounting end 24 the spring 22 is fixed to a container or capsule 26 by means of two brackets 25. Two slightly bent plates 27 are also provided at the mounting point, between which the end 24 is mounted in a fixed condition, which are either rigid or have a high spring constant. While the spring 22 does not possess a progressive characteristic of resilience under a load acting parallel with the motor axis, it does exhibit such a progressive characteristic when stressed in a circumferential direction, because with increasing deflection the wire will meet with one of the plates 27 and its effective spring length will thereby be shortened.

Also other type springs with a progressive characteristic may be employed, for example a conically coiled wire spring with uniform pitch, a cylindrical wire spring with varying pitch, a stack of plate springs of varying diameter etc. If springs of this type, which possess a progressive characteristic in only one direction, are used in a suspension system, the system may be perfected by using one set of springs for loads in one direction and a second set of springs for loads in another direction, for example in such a way that one of the sets absorbs rotational forces while a second set absorbs the weight.

The suspension system described is particularly applicable to reciprocably operating apparatus such as a motor-compressor or refrigeration compressor. The suspension system makes provision for noise suppression or reduction by resiliently mounting the apparatus resiliently by the spaced mounts each of which, in some embodiments, has a conical spring and a first stop member mounted to move with the apparatus and having an annular portion circumferentially of an end and a plurality of convolutions of the spring. A second stop member extends axially into the spring and in cooperation with the first stop member varies the resilience of the spring in a radial direction and jointly with a stop surface limits the axial movement of the apparatus to set a limit precluding the apparatus from ever making contact with other fixed surfaces, for example a capsule, around or adjacent thereof. Provision is made in all embodiments of the mounts of the suspension system according to the invention for varying the resistance or resilience of a spring in either a radial or axial mode or direction or in both modes or directions with a final limit of movement being established in both directions. All of this is accomplished in a minimum space so that the suspension system does not add to the overall size of the unit including a hermetic capsule.

While preferred embodiments of the invention have been shown and described it will be understood that many modifications and changes can be made within the true spirit and scope of the invention.

What we claim is:

1. A suspension system for a machine comprising, a plurality of spaced, resilient mounts mountable in use on a machine for resiliently suspending said machine thereon, support means comprising for each mount a fixed support supporting an individual mount on said support means, each mount comprising spring means, means on each of said mounts cooperative with said spring means to progressively decrease the resiliency of said spring means in at least one mode of deflection, said spring means comprising a conical spring comprising a plurality of helical coils and in which a radially innermost coil is at an apex of a cone defined by said spring and the outermost coil having the largest diameter is at the base of said cone, said coil at the apex of said cone defined by said conical spring being disposed eccentric relative to said coil at the base of said cone when said spring is in an unloaded condition, and in which the eccentric coils are rendered concentric when said machine is in suspension thereon in a quiescent state of said spring.

2. A suspension system for a machine comprising, a plurality of spaced, resilient mounts mountable in use on a machine for resiliently suspending said machine thereon, support means comprising for each mount a fixed support supporting an individual mount on said support means, each mount comprising spring means, means on each of said mounts cooperative with said spring means to progressively decrease the resiliency of said spring means in at least one mode of deflection, said spring means comprising a conical spring comprising a plurality of helical coils and in which a radially innermost coil is at an apex of a cone defined by said spring and the outermost coil having the largest diameter is at the base of said cone, said means cooperative with said spring means comprising means to progressively increase the resistance to deflection in an axial direction of said conical spring when said machine moves toward said fixed support of a respective mount.

3. A suspension system for a machine comprising, a plurality of spaced, resilient mounts mountable in use on a machine for resiliently suspending said machine thereon, support means comprising for each mount a fixed support supporting an individual mount on said support means, each mount comprising spring means, means on each of said mounts cooperative with said spring means to progressively decrease the resiliency of said spring means in at least one mode of deflection, said spring means comprising a conical spring comprising a plurality of helical coils and in which a radially innermost coil is at an apex of a cone defined by said spring and the outermost coil having the largest diameter is at the base of said cone, said means cooperative with said spring means comprising means to progressively increase resistance to deflection in a radial direction by said conical spring relative to a longitudinal axis of said conical spring.

4. A suspension system for a machine comprising, a plurality of spaced, resilient mounts mountable in use on a machine for resiliently suspending said machine thereon, support means comprising for each mount a fixed support supporting an individual mount on said support means, each mount comprising spring means, means on each of said mounts cooperative with said spring means to progressively decrease the resiliency of said spring means in at least one mode of deflection, said spring means comprising a conical spring comprising a plurality of helical coils and in which a radially innermost coil is at an apex of a cone defined by said spring and the outermost coil having the largest diameter is at the base of said cone, said means cooperative with said spring means comprising means to progressively increase the resistance to deflection in an axial direction and in a radial direction of said conical spring when said machine moves toward said fixed support and when said machine moves in a direction relative to the longitudinal axis of said conical spring respectively.

5. A suspension system for a machine comprising, a plurality of spaced, resilient mounts mountable in use on a machine for resiliently suspending said machine thereon, said machine having a motor having a vertical axis, support means comprising for each mount a fixed support supporting an individual mount on said support means, each mount comprising spring means, means on each of said mounts cooperative with said spring means to progressively decrease the resiliency of said spring means in at least one mode of deflection, said spring means comprising a conical spring comprising a plurality of helical coils and in which a radially innermost coil is at an apex of a cone defined by said spring and the outermost coil having the largest diameter is at the base of said cone, said spring means comprises a spring deflectable freely in a direction parallel with a vertical axis of said machine, and in which said means cooperative with said spring means comprise means to limit the deflection of said spring in a circumferential direction about an axis normal to said vertical axis.

6. A suspension system for a machine comprising, a plurality of spaced mounts disposed in use mounting a machine in suspension, support means comprising for each mount a fixed support for the mount for supporting the mount and said machine thereon, each mount comprising an elastic, conical, coil spring having convolutions resiliently mounting when in use said machine normally spaced from said fixed support, said convolutions reducing in diameter from one convolution to the other of the spring in a direction from one end toward an opposite end of said spring, means for each spring cooperative with each spring when in use to effectively progressively vary the resiliency of a respective spring in an axial direction and a radial direction in response to movement of said machine in either and both directions and relative to said fixed support, whereby relatively elastic coil springs in said mounts are caused when in use to progressively become less elastic and stronger in dependence upon the amplitude of the movement of said machine in either and both directions.

7. In combination with a reciprocably operating apparatus and a capsule enclosing said apparatus, a spring suspension comprising a plurality of spaced mounts secured to said capsule disposed mounting said apparatus within said capsule resiliently and normally spaced from the capsule, each mount comprising a conical coil spring having convolutions, said convolutions reducing in diameter from one convolution to the other of the spring in a direction from one end toward an opposite end of said spring, for each mount and coil spring thereof, a first stop member having an annular portion circumferentially of an end of said spring and a plurality of convolutions of said conical spring, said first stop member comprising a fixed stop surface, for each mount and spring thereof a second stop member extending axially into and toward said first stop member and into said coil spring and into said annular portion a distance less than the axial length of said coil spring, whereby upon movement of said apparatus relative to said capsule in a direction axially of a given coil spring the given coil spring compresses axially variably with increasing resistance until said second stop member engages said fixed stop surface limiting axial travel of said second stop member and when said apparatus moves relative to the longitudinal axis of a given coil spring said first and second stop members cooperate to progressively increase the resistance of the last-mentioned given spring to radial deflection and establish a fixed limit of radial deflection of said last-mentioned given spring.

8. In the combination according to claim 7, in which said apparatus comprises a motor shaft axis, and in which said mounts are arranged with the axis of each conical spring parallel with said motor shaft axis.

9. In the combination according to claim 7, in which said mounts are arranged in a polygonal configuration with one mount at each corner of said configuration, and in which imaginary extensions of the longitudinal axes of the springs in said mounts intersect within said polygonal configuration.

10. In the combination according to claim 7, in which said apparatus comprises a motor-compressor having a compressor cylinder having a longitudinal axis, and in which said mounts are arranged in a rectangular configuration with a mount at each corner thereof, the spring of each of said mounts having a longitudinal axis substantially corresponding with a respective diagonal of said rectangular configuration and said rectangular configuration having imaginary longer sides thereof parallel with said cylinder axis and imaginary shorter sides perpendicular thereto.

References Cited

UNITED STATES PATENTS

| | | | |
|---|---|---|---|
| 2,411,383 | 11/1946 | Miller | 248—20 |
| 2,581,416 | 1/1952 | Irby et al. | 248—358.1 |
| 3,089,639 | 5/1963 | Hannibal | 230—235 |
| 3,300,042 | 1/1967 | Gordon | 267—1 |

JOHN PETO, *Primary Examiner.*